United States Patent
Remo et al.

(10) Patent No.: US 10,085,588 B2
(45) Date of Patent: Oct. 2, 2018

(54) METHOD FOR AUTOMATIC ADJUSTMENT OF THE QUANTITY OF COFFEE AND COFFEE MACHINE USING SAID METHOD

(75) Inventors: Gianni Remo, Pistoia (IT); Ciro Adelmo Pilone, Bologna (IT); Riccardo Ziani, Bologna (IT)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 2020 days.

(21) Appl. No.: 12/528,360

(22) PCT Filed: Feb. 15, 2008

(86) PCT No.: PCT/IT2008/000097
§ 371 (c)(1),
(2), (4) Date: Aug. 24, 2009

(87) PCT Pub. No.: WO2008/105017
PCT Pub. Date: Sep. 4, 2008

(65) Prior Publication Data
US 2010/0095852 A1    Apr. 22, 2010

(30) Foreign Application Priority Data
Feb. 27, 2007 (IT) .................. FI2007A0049

(51) Int. Cl.
*A47J 31/40* (2006.01)
*A47J 31/42* (2006.01)
*A47J 31/36* (2006.01)

(52) U.S. Cl.
CPC .......... *A47J 31/42* (2013.01); *A47J 31/3614* (2013.01)

(58) Field of Classification Search
CPC .......... A47J 31/46; A47J 31/44; A47J 31/545; A47J 31/0647; A47J 31/18; A47J 31/542;
(Continued)

(56) References Cited

U.S. PATENT DOCUMENTS 3,266,410 A * 8/1966 Novi et al. ................. 99/287
4,659,023 A * 4/1987 Frei et al. ................... 241/30
(Continued)

FOREIGN PATENT DOCUMENTS

DE          9005651 U1   7/1990
DE       196 29 239 A1   1/1998
(Continued)

OTHER PUBLICATIONS

Machine Translation of EP0245197.*
(Continued)

*Primary Examiner* — Eric Stapleton

(57) ABSTRACT

The method for adjusting the quantity of coffee comprises the steps of: dispensing a predetermined quantity of coffee powder into an infusion chamber (36); by means of an electric actuator (19), closing said infusion chamber compressing the coffee powder in the infusion chamber. The method also provides for detection of at least one parameter of the electric actuator during at least a part of the step to close the infusion chamber and compress the coffee powder; and setting of the quantity of coffee powder dispensed in a subsequent dispensing cycle as a function of said parameter.

20 Claims, 6 Drawing Sheets

(58) Field of Classification Search
CPC .... A47J 31/0663; A47J 31/3614; A47J 31/00; A47J 31/053; A47J 31/057; A47J 31/0573; A47J 31/0621; A47J 31/0631; A47J 31/0657; A47J 31/24; A47J 31/32; A47J 31/34; A47J 31/40; A47J 31/404; A47J 31/441; B67D 1/0021; B67D 1/0046
USPC .................................. 99/280–286, 280–289 R
See application file for complete search history.

(56) References Cited

U.S. PATENT DOCUMENTS

| | | | | |
|---|---|---|---|---|
| 4,767,632 | A * | 8/1988 | Meier | 426/231 |
| 4,797,296 | A * | 1/1989 | Meier et al. | 426/433 |
| 5,083,503 | A * | 1/1992 | van Hattem et al. | 99/289 D |
| 5,193,438 | A * | 3/1993 | Courtois | 99/286 |
| 5,228,383 | A * | 7/1993 | Landais et al. | 99/289 R |
| 5,492,054 | A * | 2/1996 | Schneeberger | 99/289 R |
| 5,495,793 | A * | 3/1996 | Muis et al. | 99/280 |
| 6,272,974 | B1 * | 8/2001 | Pascotti et al. | 99/318 |
| 6,339,985 | B1 * | 1/2002 | Whitney | 99/286 |
| 6,628,893 | B2 * | 9/2003 | Ohno et al. | 388/800 |
| 7,673,555 | B2 * | 3/2010 | Nosler et al. | 99/279 |
| 7,845,270 | B2 * | 12/2010 | Rahn et al. | 99/289 R |
| 8,210,096 | B2 * | 7/2012 | Fin | 99/295 |
| 8,250,971 | B2 * | 8/2012 | Righetti | 99/302 P |
| 2002/0153438 | A1 * | 10/2002 | Glucksman et al. | 241/36 |
| 2007/0170879 | A1 * | 7/2007 | Martins | 318/268 |
| 2011/0162530 | A1 * | 7/2011 | Castellani | 99/279 |
| 2012/0060698 | A1 * | 3/2012 | Baldo et al. | 99/295 |
| 2012/0240777 | A1 * | 9/2012 | Righetti | 99/280 |

FOREIGN PATENT DOCUMENTS

| | | |
|---|---|---|
| DE | 19629239 A1 | 1/1998 |
| EP | 0 245 197 A2 | 11/1987 |
| EP | 0245197 A2 | 11/1987 |
| FR | 2648035 | 12/1990 |
| JP | 09173213 A | 7/1997 |
| JP | 2002345407 A | 12/2002 |

OTHER PUBLICATIONS

Machine Translation of EP 0245197.*
Machine Translation of FR 2648035.*
Machine Translation of DE 19629239.*

* cited by examiner

METHOD FOR AUTOMATIC ADJUSTMENT OF THE QUANTITY OF COFFEE AND COFFEE MACHINE USING SAID METHOD

TECHNICAL FIELD

The present invention relates to improvements to automatic machines for preparing coffee, such as and in particular, but not exclusively, espresso coffee.

More specifically, the present invention relates to a method and a device for dosing the quantity of coffee dispensed to the infusion unit at each infusion cycle.

STATE OF THE ART

In the field of automatic machines for preparing coffee, for example in particular for domestic or professional use, but also in the field of vending machines, it is necessary to accurately dose the quantity of coffee powder that is dispensed to the infusion chamber of the machine during each operating cycle. In the most recent machines the coffee is loaded in beans and a grinding unit contained inside the machine grinds a predetermined quantity of beans to produce the dose of powdered coffee required to obtain a cup of coffee. Some machines also allow the user to modify the quantity of coffee within certain limits, to obtain a stronger or weaker beverage.

U.S. Pat. No. 4,659,023 describes a method and a device for dosing the quantity of powdered coffee dispensed at each infusion cycle by a grinding unit which grinds the coffee beans contained in the machine. The dose of coffee powder is determined by detecting the pressure exerted on a sensor by the coffee powder delivered from the grinding unit.

U.S. Pat. No. 5,492,054 describes a different system for dosing the coffee with a device to adjust the quantity of powder as a function of the quality of beverage to be obtained.

These dosing systems are complex, in particular due to the need to use complex and imprecise sensors, and devices cooperating therewith to determine the quantity of powder ground.

In the most modern machines the quantity of coffee ground for each infusion cycle is determined by the number of revolutions of the grinder of the grinding unit, or in an equivalent manner by the number of revolutions of the motor that makes said grinder rotate. In substance, as the quantity of coffee powder ground is proportionate to the number of revolutions of the grinder, the latter is used as a parameter directly proportionate to the quantity of coffee powder dispensed into the infusion chamber. The number of revolutions of the grinder can be determined in a simple and reliable manner, with considerable degree of precision with inexpensive and robust sensors. For example, an encoder can be used on the shaft of the motor that controls the grinder, or a capacitive or magnetic sensor or the like, which counts the number of revolutions or fractions of revolution of the grinder by detecting the passage of reference notches provided on the grinder at a suitable angular distance, as a function of the resolution to be achieved in determining the quantity of coffee ground.

However, this particularly simple and reliable system has the drawback of being somewhat imprecise and inconstant in measuring the quantity of coffee.

In fact, this system to determine the quantity of coffee ground is influenced by the following factors:
adjustment of the distance of the grinders of the grinding unit,
type of coffee beans present in the loading hopper of the machine,
voltage of the power supply of the machine,
state of wear of the grinders of the grinding unit,
quantity of coffee present in the bean container at the time of grinding,
ambient temperature and humidity,
number of revolutions of the grinder.

Of these parameters only the last can be accurately controlled in the aforesaid manner with a specific sensor. The other factors unpredictably modify the correlation between number of revolutions of the grinder and quantity of coffee powder obtained. Moreover, as mentioned above, as far as the grinders are concerned, there are machines with fixed settings and others with variable settings, in which the user can take action within a certain margin to modify the distance between the grinders, in order to vary the dimension of the ground powder and consequently the organoleptic properties of the beverage prepared therewith. This makes measuring the quantity of coffee ground by the number of revolutions of the grinder even more susceptible to errors. Moreover, the system has a certain degree of instability through time with deviation of the value of quantity in weight ground with respect to the factory setting.

If the quantity of powder for each cycle decreases this causes a high dispensing speed due to the decreased pressure drop to which water delivered from the boiler of the machine is subjected while passing through the compressed coffee powder in the infusion chamber, thereby determining an end product of poor quality. Conversely, if the trend through time is an increase in the quantity of coffee with respect to the factory set value, there is the risk that the machine will no longer be able to operate due to triggering of the overstress control provided on the infusion chamber—closing actuator. This control is set so that the infusion cycle is aborted when the motor unit that controls closing of the infusion chamber exceeds a maximum absorption limit, indicating the fact that excessive resistance is encountered during closing of the infusion chamber due to the excessive quantity of coffee powder therein.

EP-A-245197 discloses a device for the preparation of coffee, wherein a grinding device feeds ground coffee to an infusion chamber. An electric motor is provided for opening and closing the infusion chamber. A pressure sensor is also provided, associated to the movable portion of the infusion chamber, in order to detect the pressure generated during closing of the chamber. Said pressure is determined by the amount of coffee powder in the chamber and said pressure is used as a control parameter to change the amount of coffee powder. The device is complicated due to the need of arranging an extra pressure sensor at the brewing or infusion chamber.

DE-A-19629239 discloses a device for the preparation of coffee beverages, including an infusion chamber, a closure member for said infusion chamber, a detector for detecting the displacement of said closure member and a sensor for detecting the flow rate of the coffee beverage dispensed by the infusion chamber during the brewing process. The device is designed such that if the flow rate does not correspond to a preset value, the travel of the closure member is changed such that at the subsequent brewing cycle the powder coffee is pressed at a lower or higher degree, depending on the flow rate being lower or higher with respect to the desired pre-set value.

DE-U-9005651 discloses a machine for producing coffee beverages with a coffee grinder, having a device measuring the revolutions of the grinder in order to establish the amount of ground coffee.

OBJECTS AND SUMMARY OF THE INVENTION

According to one aspect, an aim of the invention is to provide a method for control and automatic adjustment of the dose or quantity of coffee powder dosed in an infusion cycle which at least partly overcomes the aforesaid drawbacks.

An object of one embodiment of the invention is to provide a method to control the quantity of coffee powder dispensed in an infusion cycle, i.e. to automatically adjust the quantity of coffee, which allows the correction of any errors maintaining substantially constant through time the dose of coffee, i.e. the quantity in weight of coffee, optionally also allowing the user to adjust this dose within certain limits.

According to a different aspect, the object of the invention is to provide an automatic machine for preparing coffee which supplies a dosage that is more accurate and constant through time, i.e. automatic adjustment of the dose or quantity of coffee powder in the infusion chamber.

Within the scope of the present description and of the appended claims, dose or quantity is generally intended as a quantity in weight and dosage as a dispensing of a quantity in weight of coffee powder.

In one embodiment, the invention provides for a method for automatic adjustment of the dose, i.e. of the quantity in weight of coffee powder in a machine for preparing coffee, in particular espresso coffee, comprising the following steps:

dispensing a predetermined quantity of coffee powder into an infusion chamber, through an electric actuator, closing the infusion chamber compressing the coffee powder in the infusion chamber, detecting at least one operating parameter of the electric actuator during at least a part of the step of closing the infusion chamber and compressing the coffee powder, so as to set the dose of coffee powder dispensed in the subsequent dispensing cycle as a function of the operating parameter detected.

In substance, the method according to the invention is based on the idea of controlling at each dispensing cycle, or during at least some of the dispensing cycles performed by the machine, the quantity of coffee powder effectively dispensed by means of an electrical parameter of the actuator that closes the infusion chamber, said parameter in particular being a function of the quantity of coffee powder compressed. Consequently, when through said parameter excessive or insufficient coffee powder is detected in relation to a pre-set value, action can be taken on the dispensing unit to modify the quantity of coffee dispensed during the subsequent infusion cycle and in substance obtain automatic adjustment of the dose, i.e. of the quantity in weight of coffee.

For example, if during the current infusion cycle the quantity of powder compressed in the infusion chamber is excessive with respect to the preset quantity, during the subsequent cycle the quantity of coffee is decreased through a suitable setting of the dispensing system. Conversely, if during the current cycle the quantity of coffee powder is below the preset quantity, a greater quantity of coffee will be dispensed during the subsequent cycle.

It is easy to understand that optimal operation is achieved when the control is performed at each infusion cycle. Nonetheless this is not strictly necessary. In fact, assuming that the machine performs infusion cycles with a relatively high frequency with respect to the speed with which the factors that influence correlation between quantity of coffee and number of revolutions can vary, the control could be performed only during some infusion cycles. For example, the control can be performed during the first cycle subsequent to the machine being switched off and on again, or if a time exceeding a minimum time interval has elapsed since the previous infusion cycle.

In general, coffee powder can be dispensed into the infusion chamber by a device of any type. In fact, the aforesaid control method can also be used in a machine in which a coffee powder is dispensed in doses to the infusion chamber from a powder container. In this case, coffee can be dispensed, for example, through an auger, a rotating distributor, or the like. Control of the electrical parameter of the infusion chamber closing actuator allows, during the subsequent infusion cycle, modification of the number of revolutions of the dispenser to adjust the quantity of coffee powder dispensed in the case of a discrepancy between preset quantity and actual quantity of coffee. In this case a sensor or transducer is provided to detect the number of revolutions of the auger or other dosing device.

In a preferred embodiment of the invention however, dispensing is performed through a grinding unit. This unit grinds the quantity of coffee beans required during each cycle. The coffee is then dispensed directly or indirectly from the grinding unit to the infusion chamber and control of the electrical parameter of the infusion chamber closing actuator allows adjustment of the number of revolutions of the grinder of the grinding unit in the subsequent infusion cycle according to the criteria indicated above.

In a practical embodiment, the method according to the invention provides for definition of an interval delimited by a maximum value and a minimum value, within which the value of the aforesaid parameter of the electric actuator must fall. In this case, dispensing of the coffee powder is controlled as follows:

if the parameter controlled exceeds the maximum value of the acceptable interval of values, the dose of coffee powder dispensed during the subsequent cycle is decreased with respect to the predetermined quantity of the cycle in progress;

if the parameter does not reach the minimum value, the dose of coffee dispensed during the subsequent cycle is increased with respect to the predetermined quantity of the cycle in progress;

the quantity of coffee is maintained unvaried during the subsequent cycle if the parameter falls within the interval of acceptable values.

Normally, the infusion chamber is designed so that it always reaches one position at the end of the closing operation, determined by the closing mechanism. This means that the total volume of the coffee powder compressed in the infusion chamber is always the same at each cycle. In this case, in an advantageous embodiment the method provides for interruption of the infusion chamber closing step if the stress exerted by the actuator exceeds a threshold value. This stress can be determined using the same parameter used to control the quantity of coffee and correct the dose of coffee during the subsequent cycle, although this is not strictly necessary. For example, the parameter used to control the quantity of coffee powder actually dispensed to the infusion chamber can be an average value calculated through time, i.e. a mobile average of the absorbed current, while the limit of the stress exerted by the closing actuator is obtained by controlling an instantaneous parameter, such as the instantaneous current absorbed by the electric motor.

In a manner known per se, if the quantity of coffee in the infusion chamber is so great that it causes stress on the closing mechanism that makes the electric parameter controlled exceed an alarm value, the infusion cycle is interrupted and the infusion chamber is opened unloading the coffee powder without it being used and consequently without any coffee being prepared.

In conventional machines this situation makes it impossible for the machine to operate and requires a maintenance operation to reset the machine correctly, for example, setting the value of the number of revolutions of the grinder or the number of revolutions of a feeder that determine the predetermined quantity of coffee powder for each dispensing cycle. Conversely, by applying the method according to the invention, the dose of coffee dispensed during the subsequent cycle to the one that was interrupted will be lower and can therefore give rise to a correct and complete infusion cycle.

In practice, the method can be implemented so that in the case of a quantity of coffee not corresponding to the preset quantity, i.e. in the case in which the parameter controlled is outside the interval of acceptable values, a control unit imposes a variation (increase or decrease) according to fixed values. For example, when the controlled parameter does not reach the minimum acceptable value, during the subsequent cycle the grinder of the grinding unit could be made to perform a number of revolutions equal to the preset number plus N, where N is a fixed value. Analogously, if the controlled electrical parameter exceeds the maximum set value, during the subsequent cycle the number of revolutions of the grinder can be equal to the preset number minus N.

In the event of an infusion cycle being interrupted due to the maximum stress value on the infusion chamber closing mechanism being reached, it may be necessary to take action with subsequent decreases in the total number of revolutions of the grinder, in the event of the decrease of N revolutions not being sufficient. In this case the machine will abort two or more consecutive infusion cycles, but will still return to operating conditions automatically.

It would also be possible to set the control program so that the number N of revolutions (which can also be a fraction of a number), by which the preset number is modified if the controlled parameter exceeds the interval of acceptable values, is variable. For example, the real value of the controlled parameter can be compared with the limit values of the acceptable interval so that the greater the difference between the real value of the controlled parameter and the nearest acceptable value is, the higher the value N will be set. This allows faster correction of machine operation. Therefore, if for any reason the quantity of coffee actually dispensed into the infusion chamber falls substantially below an acceptable minimum, the control unit can correct the preset quantity of coffee, increasing by the factor N the number of revolutions of the grinder imposing a higher value of N with respect to the one that would be set in the case of a modest discrepancy between the real value of the controlled electrical parameter and the nearest acceptable value.

In practice, the parameter of the electric actuator that is used for this type of automatic control and adjustment can be any parameter indicative of the stress that is produced to reach the closing position of the infusion chamber. In a particularly advantageous embodiment, the parameter used is a function of the current absorbed by the electric actuator that controls closing of the infusion chamber and is therefore proportional to the power absorbed by the electric actuator, as the supply voltage is constant.

In a particularly advantageous embodiment the parameter is constituted by a mobile average of the absorbed current, as this function has proved particularly stable and consequently useful for this type of control. Moreover, it assumes a precise and easily repeatable peak value as a function of the quantity of coffee that is dispensed into and compressed in the infusion chamber. It is consequently possible to easily identify a one-to-one correspondence between quantity of coffee powder to be actually dispensed into the infusion chamber and maximum value of the mobile average of the absorbed current. This makes it possible to use the method according to the invention in an efficient and reliable manner also in those machines in which the user can set variable quantities of coffee powder according to the quality of beverage to be obtained.

When the infusion chamber is designed to be able to assume different closing positions rather than a single position, it is possible to prevent the infusion cycle from aborting in the case of an excessive quantity of coffee in the infusion chamber. In fact, if the quantity of coffee dispensed is unintentionally so much higher than the theoretically set value as to cause overstressing of the closing mechanism in the event of the infusion chamber reaching the final closing position, the actuator can be controlled so that the infusion chamber is not completely closed, but reaches an incomplete closing position which is nonetheless sufficient to perform the infusion cycle, i.e. in which an adequate seal is reached between the parts of the infusion chamber to allow pressurized hot water to be fed and made to flow through the compressed coffee powder. In this case the method according to the invention allows the quantity of coffee to be corrected during the subsequent cycle and therefore the machine returns to operate with the required quantity of coffee within one or, in any case, a few consecutive dispensing cycles taking the infusion chamber to the correct completely closed position.

According to a different aspect, the invention also relates to a machine for preparing coffee with a control unit that implements a method as defined above.

Further advantageous features and embodiments of the method and of the machine according to the invention are indicated in the appended claims and will be described in greater detail with reference to a non-limiting embodiment.

BRIEF DESCRIPTION OF THE DRAWINGS

The invention will be better understood by following the description and accompanying drawing, which shows practical non-limiting embodiments of the invention. More specifically, in the drawing.

DETAILED DESCRIPTION OF EMBODIMENTS OF THE INVENTION

Figure 1:
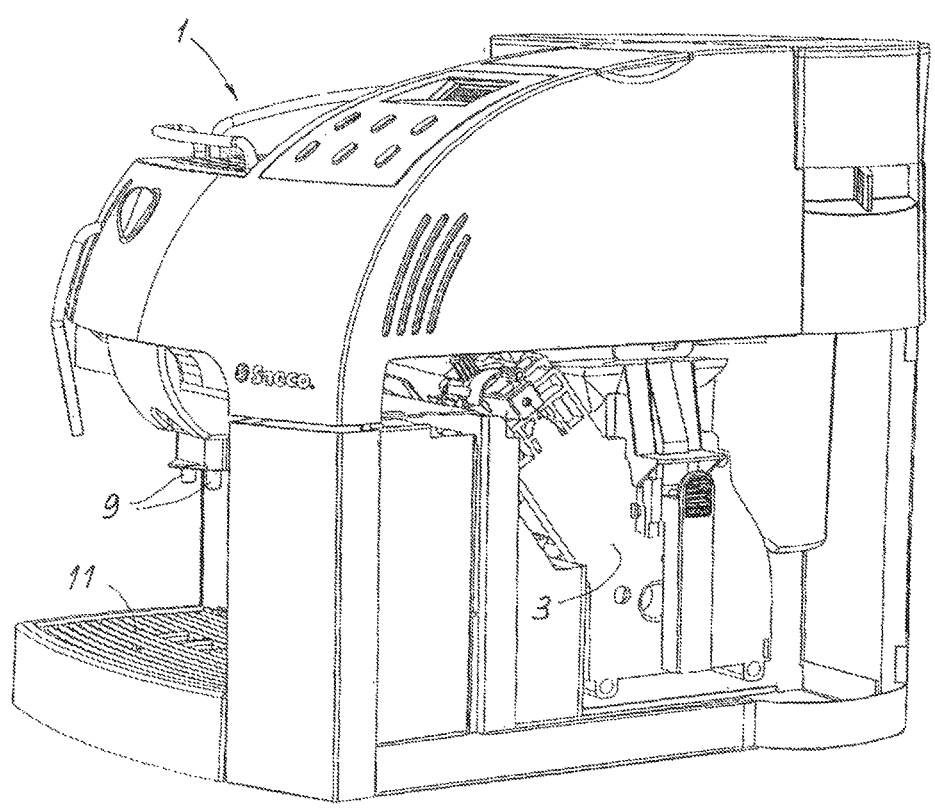
FIG. 1 shows an automatic coffee machine to which the present invention can be applied.
Figure 2:
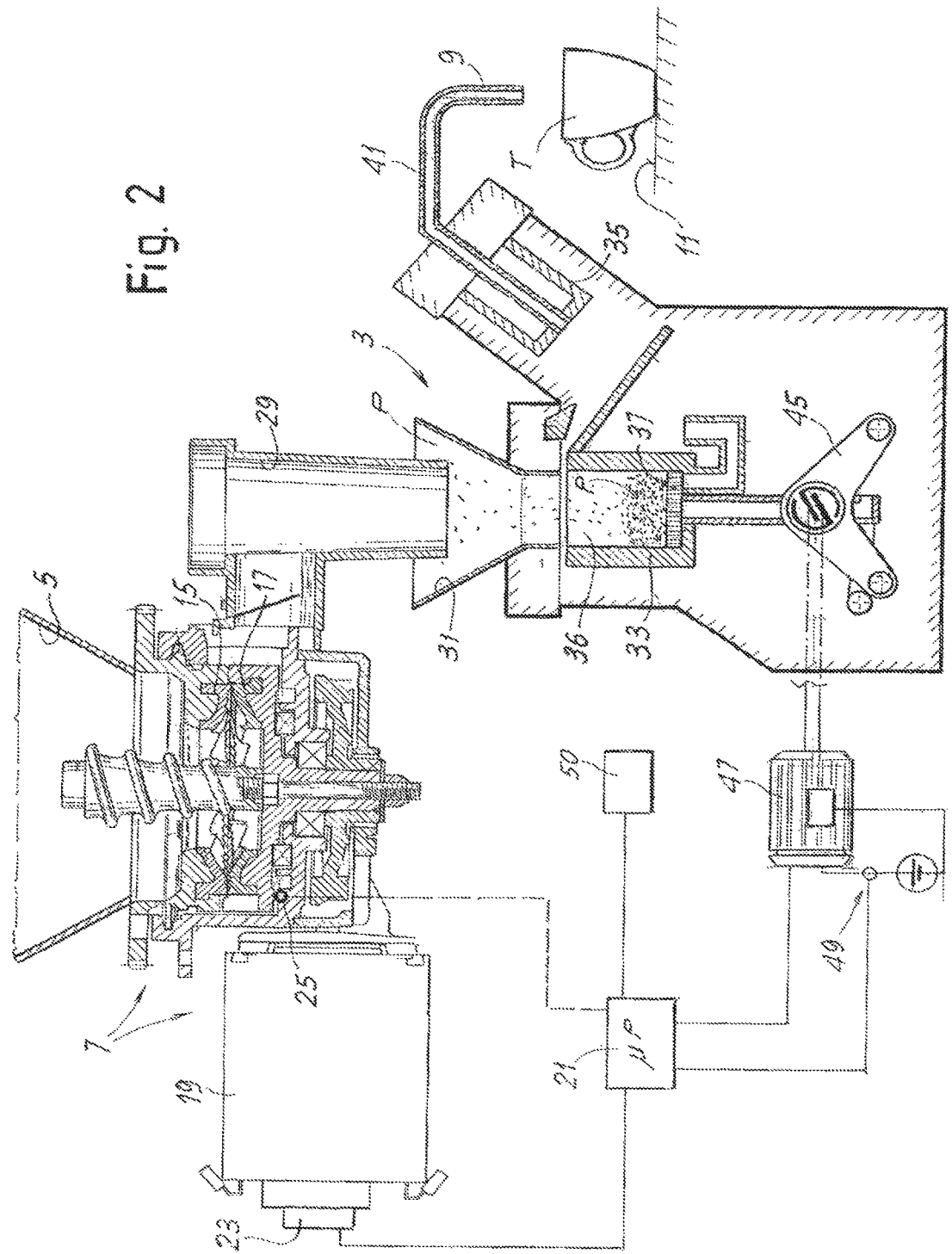
FIG. 2 shows a diagram of the grinding unit and of the infusion unit of the coffee machine.

FIG. 1 shows, in a perspective view, a coffee machine to which the invention can be applied. In this embodiment, this is an automatic coffee machine for domestic use, comprising an infusion unit 3 contained inside which is an infusion chamber in two parts movable with respect to each other, described in greater detail hereunder. Coffee powder, obtained by grinding coffee beans contained in a container, schematically indicated as a hopper 5 in FIG. 2, is dispensed into the infusion unit 3. Still in FIG. 2 reference number 7 indicates a grinding unit that grinds the coffee beans contained in the hopper 5 to produce a determinate quantity of coffee powder, which is then dispensed into the infusion chamber of the unit 3.

By feeding pressurized hot water through the compressed coffee powder in the infusion chamber of the infusion unit 3 coffee is produced, which is dispensed through spouts 9 placed over a drip tray 11 on which one or more cups T or other containers are placed.

With reference to the diagram in FIG. 2, the grinding unit 7 comprises a pair of grinders 15, 17. In the embodiment shown in the drawing, these are flat grinders, but it must be understood that the conformation of the grinding unit is not relevant for the purposes of implementation of the present invention, and can assume any other configuration suitable to grind the coffee beans contained in the hopper 5. As observed above, it would also be possible to implement the method described hereunder in greater detail in a machine in which the grinding unit 7 is replaced with a simple dispenser of coffee powder delivered from a powdered coffee receptacle or container. In both cases, both the auger or other feeder and the grinding unit constitute a doser of coffee powder to the infusion unit 3.

The grinding unit 7 is operated by an electric motor 19, for example a stabilized 24 V direct current motor. The use of actuators of a different type would also be possible. The motor 19 is interfaced with a control unit 21, for example a programmable control unit with a microprocessor or the like. The control unit can be associated with a memory containing a program that implements the method to be described hereunder. In one embodiment, the program is memorized in an EPROM, in a ROM or in another suitable storage media.

The motor 19 can be equipped with an encoder 23 through which the control unit 21 can detect the number of revolutions made by the motor 19. Alternatively, or in combination, the control unit 21 can be interfaced with one or more sensors 25 mounted on the grinding unit 7 and suitable to read the number of revolutions or fractions of revolution made by the rotating grinder 17. Whatever solution is adopted, the control unit 21 is able to activate and deactivate the motor 19 and to detect, directly or indirectly, the number of revolutions and/or fractions of revolution made by the grinder 17 at each infusion cycle, i.e. at each operating cycle of the machine 1.

When the grinding unit 7 is substituted by a doser of powder delivered from a receptacle, the control unit 21 can be interfaced with the control motor of a feed auger or other equivalent member to activate and deactivate dispensing of coffee and to determine the number of revolutions of the dispenser and, therefore, ultimately the quantity of coffee dispensed.

The control unit 21 is programmed so that at each dispensing cycle a predetermined quantity or dose of coffee powder is dispensed from the grinding unit 7. The predetermined quantity is defined, i.e. expressed in terms of number of revolutions (optionally fractions of revolution) of the grinder 17, of the motor 19 or, in any case, of the coffee powder dosing element.

In the embodiment shown, the coffee powder produced by the grinding unit 7 is delivered through a duct 29 into an inlet or hopper 31 disposed in the upper part of the infusion unit 3 and from the hopper 31 the powder P falls into the underlying portion of the infusion chamber of the infusion unit 3, when this is in the open configuration.

Figure 3:
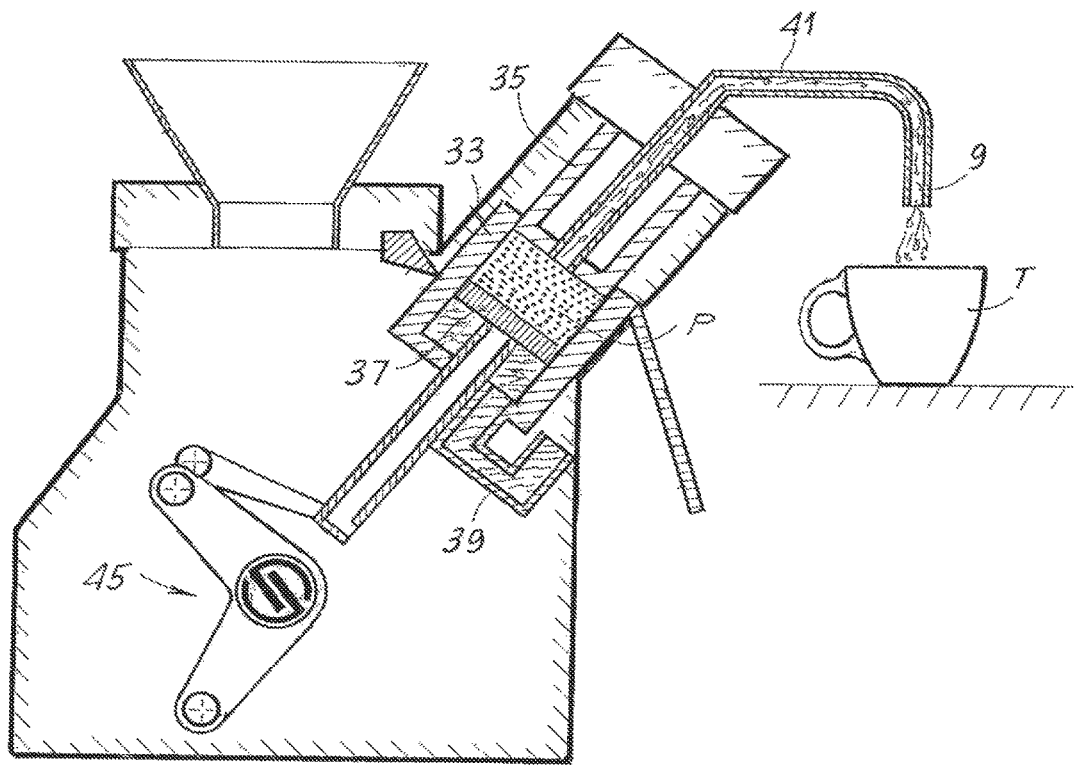
FIG. 3 shows a schematic view of the infusion unit with the infusion chamber closed.

The infusion unit 3 can be designed in any way. In general, it will have an openable and closable infusion chamber. In one embodiment, the infusion chamber comprises two reciprocally movable portions. Preferably, one portion is movable and one is fixed with respect to a load-bearing structure of the machine. FIGS. 2 and 3 show a particular embodiment of an infusion unit 3 which can be used in combination with the present invention. However, it must be understood that this unit is shown here by way of example as it can vary in forms, arrangements and operating criteria to the extent in which it remains compatible with the operating logic of the automatic control and adjustment method of the dose of coffee forming the subject-matter of the present invention.

In one embodiment, the infusion unit 3 comprises an infusion chamber with two portions 33 and 35. The portion 35 is fixed and the portion 33 is movable and defines therewithin a seat 36 into which the coffee powder P from the grinding unit 7 is dispensed when said portion 33 of the infusion chamber is in the position in FIG. 2, i.e. under the hopper 31.

The portion 33 of the infusion chamber can be moved from the position shown in FIG. 2 to the position shown in FIG. 3, where it cooperates with the portion 35 to close the infusion chamber and compress the coffee powder P contained therein. In one embodiment, the portion 33 of the infusion chamber has a movable bottom 37 through which pressurized hot water fed from a duct 39 can flow. In this embodiment, the fixed portion 35 of the infusion chamber is in fluid connection through a duct 41 with the dispenser spouts 9, only one of which is shown schematically in FIGS. 2 and 3.

Reference number 45 generically indicates a mechanism for transmitting the opening and closing movement of the infusion chamber 33, 35 and for compressing the coffee powder through the movement of the chamber 33, 35, and the bottom 37 thereof. The mechanism 45 is operated by an electric motor, indicated schematically here with 47 in a lateral position, but which is actually aligned with the axis of oscillation of the mechanism 45, all as known per se.

The motor 47 can be a low voltage direct current electric motor, for example 24V stabilized. The motor 47 is interfaced with the control unit 21 so that the latter can activate and deactivate the motor 47. A current sensor is also provided, schematically shown at 49, connected to the central control unit 21, through which the latter can determine the current absorbed by the motor 47 in the various closing and opening steps of the infusion chamber.

Figure 6:
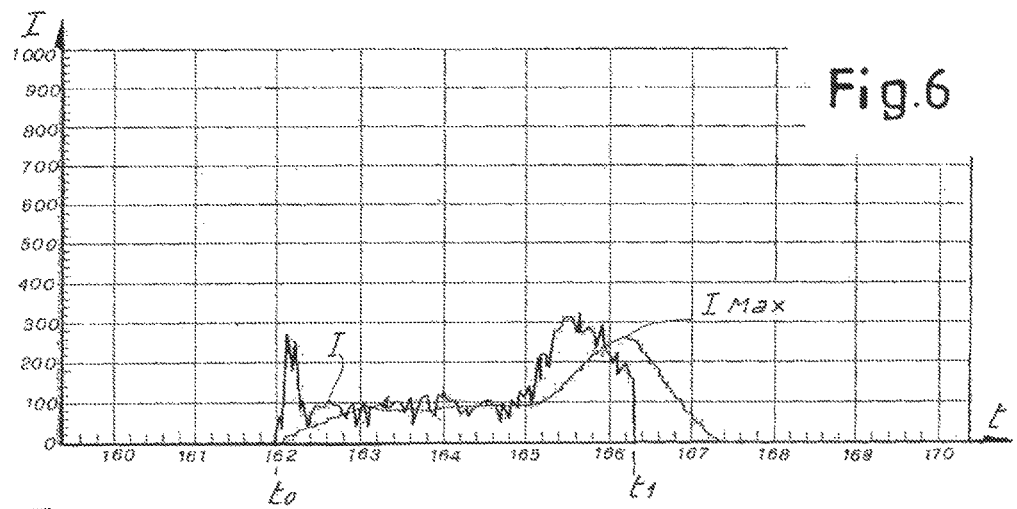
FIGS. 6, 7 and 8 show the trend of the current absorbed by the closing motor of the infusion chamber in three different operating conditions.
Figure 7:
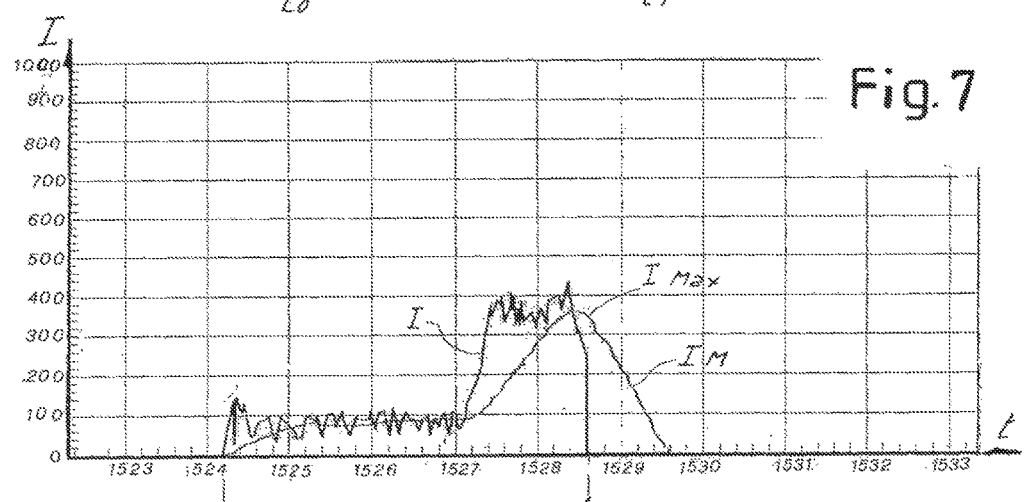
Figure 8:
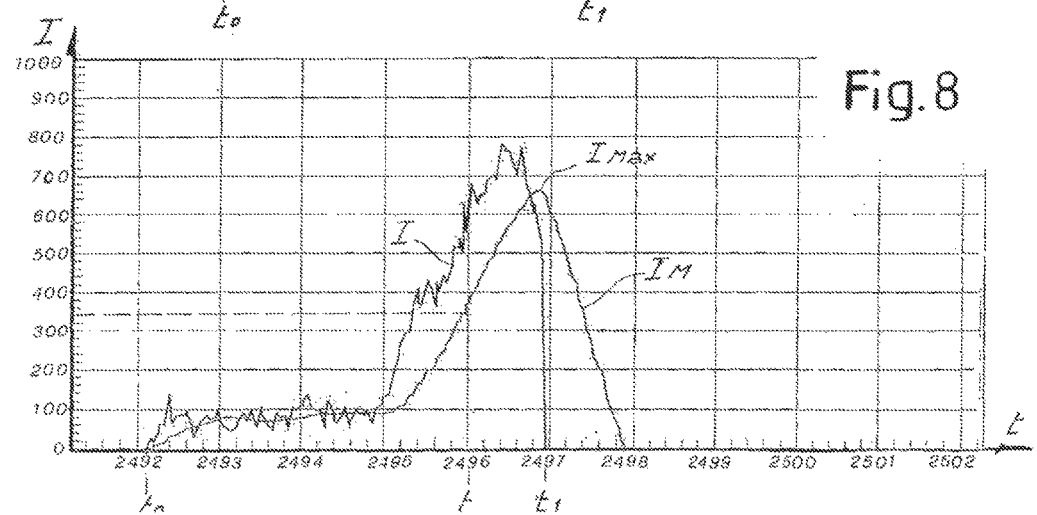

FIGS. 6, 7 and 8 show the trend of the current absorbed by the motor 47 during the movement for closing the infusion chamber and compressing the coffee powder P in said chamber, i.e. the movement from the position in FIG. 2 to the position in FIG. 3. More specifically, the three FIGS. 6, 7, and 8 show the trend of the current I absorbed by the motor 47 in three different conditions, which vary according to the quantity in weight of coffee powder P dispensed into the infusion chamber. More specifically, FIG. 6 shows the trend of the current I when the infusion unit 3 is loaded with a dose of 8 g of coffee. FIG. 7 shows the trend of the current I when the infusion unit 3 is loaded with 9 g of coffee, while FIG. 8 shows the trend of the current I when a quantity of ground coffee equal to 10 g is dispensed into the infusion chamber. These quantities are substantially those that a user can set on automatic machines that allow adjustment of the quantity of coffee to modify the organoleptic properties of the beverage prepared.

In the diagrams in FIGS. 6, 7, and 8, $t_0$ indicates the starting time of the infusion chamber closing cycle, $t_1$ the time of completion of the closing cycle and stopping of the motor 47. The diagram representing the absorbed current I is superimposed with a curve, indicated with $I_M$, which represents the trend of the mobile average of the absorbed current relative to the last second of motor operation. In other terms, at the generic point t along the abscissa, the curve $I_M$ gives the average value of the absorbed current in the time interval [t; t−Δ] where Δ=1 second.

It can be seen in the three diagrams in FIGS. 6, 7, and 8, that the curve $I_M$ has a well-defined maximum ($I_{MAX}$), the value of which depends strongly on the quantity of coffee that has been dispensed into the infusion chamber. It has been experimentally determined that for each quantity of coffee a relatively narrow well-defined interval can be defined, within which the value $I_{MAX}$ of the curve $I_M$ falls. It is thus possible to define well-determined bands of values, each corresponding to a quantity of powdered coffee, which the user can select within a relatively narrow interval (for example 8-10 grams), within which the quantity of coffee powder can be varied maintaining it at values compatible with correct operation of the machine.

This allows the operating parameter of the electric actuator 47, represented in this embodiment by the mobile average $I_M$, to be used to verify whether the quantity of powdered coffee dispensed into the infusion chamber at each cycle corresponds to the quantity preset by the user (or set in the factory, if the machine does not allow the user to vary said quantity).

Figure 4:
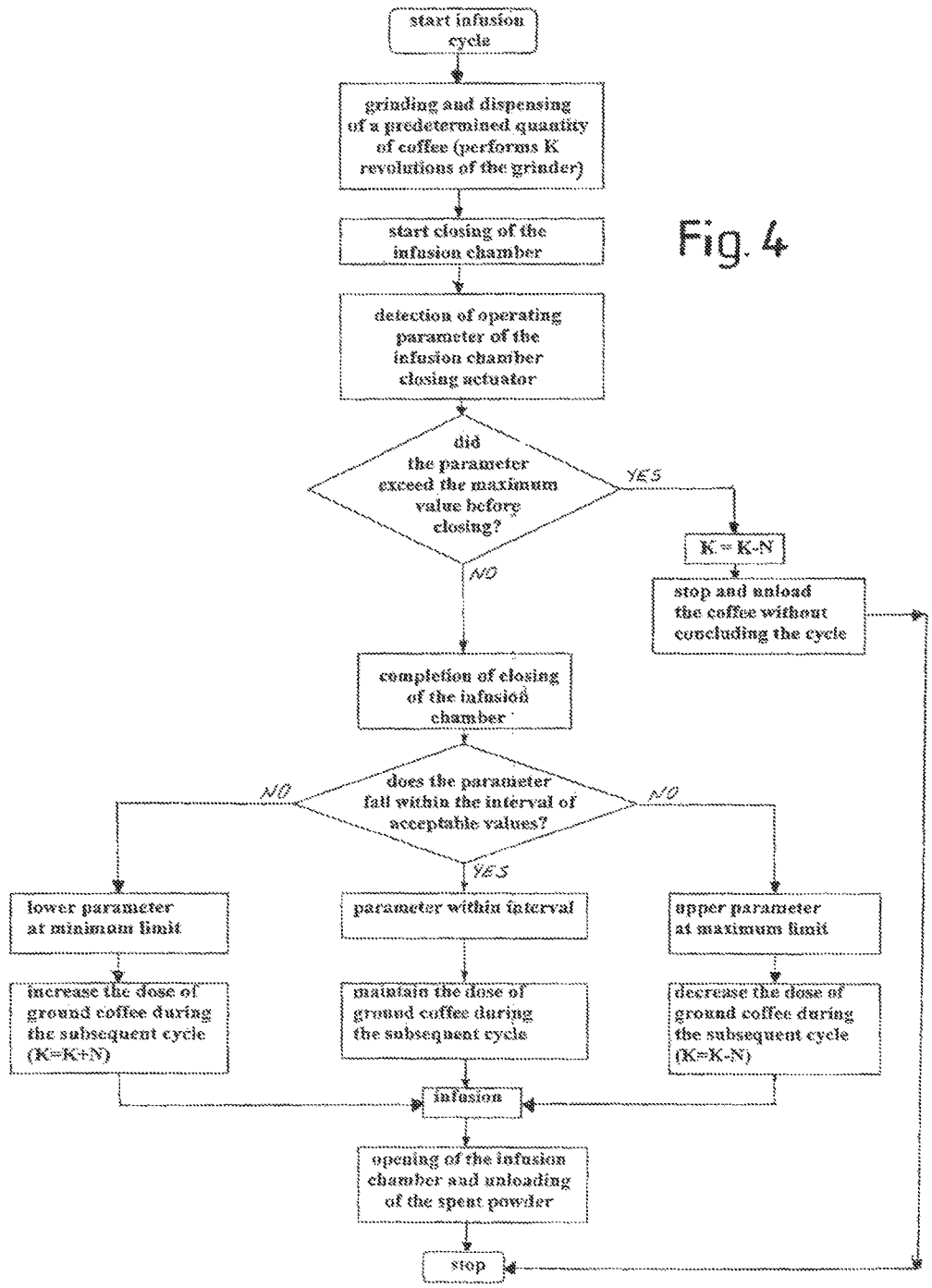
FIGS. 4 and 5 show block diagrams relative to two embodiments of the method according to the invention.

This correspondence between parameter of the electric actuator 47 and quantity of coffee powder actually present in the infusion chamber allows the machine 1 described above to be controlled according to the method schematized and summarized in the block diagram in FIG. 4 and described hereunder.

When the user wishes to prepare a cup of coffee, he will start the infusion cycle. As in this embodiment the machine is equipped with a grinding unit, starting the infusion cycle will activate the grinding unit 7 which grinds a preset quantity of coffee powder. As stated above this quantity is defined in terms of number of revolutions or fractions of revolution of the grinder 17 and/or of the motor 19, which number is indicated with K in the flow chart.

After dispensing the quantity of ground coffee into the cavity 37 of the portion 33 of the infusion chamber, which is in the position in FIG. 2, the control unit 21 starts the closing step of the infusion chamber to pass from the position shown in FIG. 2 to the position shown in FIG. 3. During this movement the control unit 21 receives from the sensor 49 the value of current instantaneously absorbed by the motor 47 and calculates the mobile average $I_M$. If this parameter exceeds a maximum safety value before the infusion chamber reaches the closed position shown in FIG. 3, this means that the infusion cycle cannot be concluded, as otherwise excessive stress would be exerted on the mechanism 45, which could cause damage to the machine. In this case the infusion cycle stops and the coffee is unloaded from the infusion chamber without closing of the chamber being completed and consequently without the beverage being dispensed.

Conversely, if the controlled parameter ($I_M$) does not reach the maximum alarm value, and the infusion chamber reaches the correct position in FIG. 3, the control unit starts the infusion by activating the pump (not shown) which dispenses pressurized hot water (also not shown) into the infusion chamber 33, 35. Besides this (simultaneously to infusion, before infusion or after infusion) the control unit 21 verifies whether the controlled parameter ($I_M$) falls within an interval of acceptable values defined by a maximum acceptable value ($I_1$) and a minimum acceptable value ($I_2$). These two acceptable values are in actual fact dependent on the quantity of coffee set by the user, if the machine has this function. Therefore, the interval of acceptable values defined in the block diagram in FIG. 4 is an interval that may not be unique, but dependent on the quantity of coffee that has been set by the user through a suitable interface 50 with the control unit 21.

The control unit 21 is programmed so that if the controlled parameter falls within the interval [$I_2$; $I_1$] of acceptable values, no adjustment will be made with regard to the quantity of coffee ground during the subsequent infusion cycle.

If the parameter is below the minimum limit ($I_2$) of the interval of acceptable values, the central control unit 21 will ensure that during the subsequent infusion cycle the quantity of coffee ground by the grinding unit 7 and then dispensed into the infusion chamber is greater than the quantity dispensed in the current cycle. This is achieved by ensuring that during the subsequent cycle the number of revolutions and/or fractions of revolution K of the grinder 17 is higher than the number of revolutions or fractions of revolution of the current cycle. As mentioned above, the variation in the number of revolutions can be a fixed variation or a variation which is variable as a function of the discrepancy between real value of the detected parameter and minimum acceptable value. In the flow chart, N indicates the variation imposed on the number of revolutions K, so that if this variation is necessary during the subsequent cycle we will have $K_{(j+1)}=K_j+N$.

Conversely, when the control parameter $I_M$ exceeds the maximum value of the interval of acceptable values, the control unit 21 in a specular manner to the one defined above ensures that during the subsequent infusion cycle the quantity of ground coffee dispensed into the infusion chamber is lower by decreasing by a fixed or variable value the number of revolutions or fractions or revolution of the grinder 17, imposing $K_{(j+1)}=K_j-N$.

After infusion, the infusion chamber is opened and the spent coffee powder is unloaded from said chamber, the portion 33 of the infusion chamber returning to the position in FIG. 2 to receive the next load of ground coffee.

From the above description it is understood how the method for automatic adjustment of the quantity of coffee dispensed at each infusion cycle according to the invention allows quick and automatic adaptation, with a self-learning function, of the behavior of the machine when there is a variation in the parameters that cause a variation in the quantity of ground coffee with respect to the theoretical value corresponding to a determinate number of revolutions and/or fractions of revolution (K) of the grinder 17. In this way, a drift due, for example, to variations in environmental conditions, in the properties of the coffee beans, in the wear of the grinders or the like is corrected in the interval of one or, in any case, a few infusion cycles.

Even when the coffee is not ground by a grinding unit 7, but is dispensed from an auger feeder or the like, the loading conditions of the infusion chamber 33 can vary, for example, as a result of a greater or lesser compression of the coffee powder in the receptacle above the dispensing auger. Also in this case the method according to the invention allows these unforeseeable variations to be taken into account and correction of the errors during the subsequent infusion cycles.

The description above refers to the typical case of an infusion chamber which is designed always to close in a single operating position, i.e. infusion position. This position is usually determined by the kinematic structure of the mechanism 45. The diagram in FIG. 4 also represents control of the stress that causes forced interruption of the infusion cycle in the case of overstress. In the case of overstress, the value K is decreased during the subsequent cycle. This decrease can be of a value N, as indicated in the diagram, or also of a greater value, such as 2N or 1.5 N.

Nonetheless, it would also be possible to provide an infusion chamber that is able to operate even without necessarily reaching a unique closing position, represented by the stroke end of the closing movement. In this case, the method according to the invention can be improved substantially to prevent the carrying out of infusion cycles which are aborted, i.e. which cannot be terminated due to an excessive quantity of coffee in the infusion chamber. In this case the method according to the invention can develop according to the steps schematically summarized in the flow chart in FIG. 5 and will be described hereunder.

Figure 5:
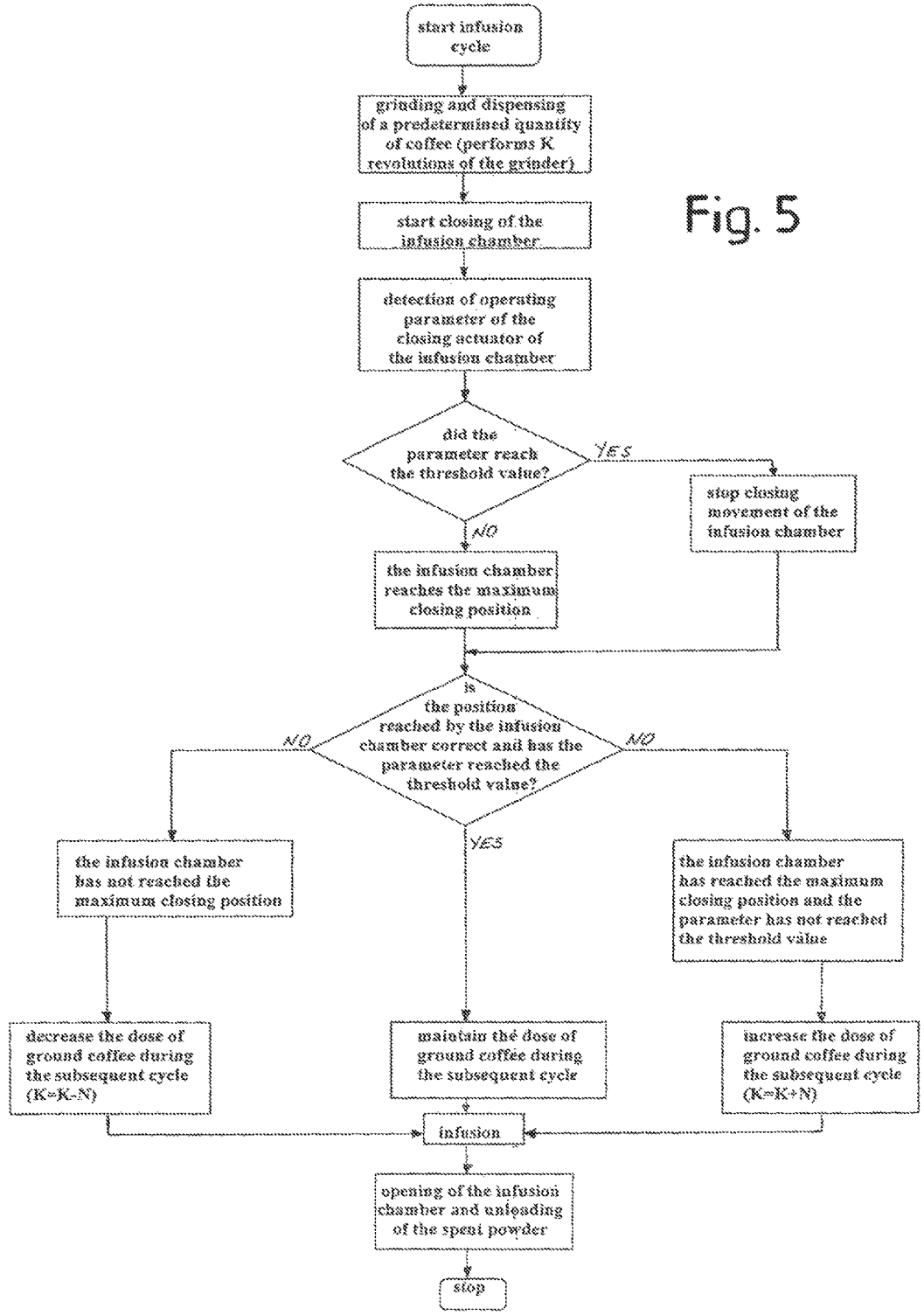

As can be seen from comparing the flow charts in FIGS. 4 and 5, in this embodiment if the controlled parameter exceeds the maximum admissible value before closing, the cycle is not interrupted and the coffee unloaded, but instead the closing movement of the infusion chamber is stopped. It is assumed that in the position reached the chamber is sufficiently closed to be able to perform an infusion cycle.

Subsequent operation is substantially equivalent to that illustrated with reference to FIG. 4, with the different that the factors to be controlled to modify in one direction or the other the quantity of coffee dispensed during the subsequent cycle are two: the value of the controlled parameter ($I_M$) and whether the position of complete closing of the infusion chamber has been reached. The control logic is clearly summarized in the diagram in FIG. 5. If the infusion chamber has reached the maximum closing position, i.e. the stroke end position, the system operates as described with reference to FIG. 4. Conversely, incomplete closing of the infusion chamber in any case indicates an excessive quantity of coffee present in the chamber and this consequently gives rise to a decrease in the quantity of coffee dispensed during the subsequent cycle (K=K−N is set at the subsequent cycle).

It is understood that the drawing only shows an example given by way of a practical demonstration of the invention, as said invention can vary in forms and arrangements without however departing from the scope of the concept underlying the invention. Any reference numbers in the appended claims are provided to facilitate reading of the claims with reference to the description and to the drawing, and do not limit the scope of protection represented by the claims.

The invention claimed is:

1. A machine for preparing coffee comprising:
a coffee powder doser;
an infusion chamber with at least two portions movable with respect to each other, said chamber in communication with said doser;
an electric actuator for opening and closing the infusion chamber;
a programmable control unit, interfaced with said doser and with said electric actuator, to:
dispense, through said doser, a predetermined quantity of coffee powder into said infusion chamber;
perform a cycle to close said infusion chamber;
deliver hot water into said infusion chamber,
detect at least one electrical operating parameter of said electric actuator during closing of the infusion chamber, said operating parameter being a function of a current absorbed by the electric actuator indicating a stress on said electric actuator to reach a closing position of the infusion chamber;
determine whether the determined electrical parameter is within known limits; and
adjust a quantity of coffee powder dispensed in a subsequent dispensing cycle as a function of said electrical operating parameter, when said determined electrical parameter is outside the known limits.

2. The machine as claimed in claim 1, wherein said doser comprises:
a grinding unit to grind coffee beans and produce said coffee powder.

3. The machine as claimed in claim 2, further comprising: a sensor associated with said grinding unit to determine a number of revolutions of the grinding unit, said predetermined quantity of coffee powder being defined in terms of the number of revolutions of said grinding unit.

4. The machine as claimed in claim 1, wherein said doser comprises a powdered coffee dispenser.

5. The machine as claimed in claim 1, wherein said control unit is programmed to:
decrease the quantity of coffee powder dispensed during the subsequent cycle with respect to said predetermined quantity, if said operating parameter exceeds a maximum set value;
increase the quantity of coffee powder dispensed during the subsequent cycle with respect to said predetermined quantity, if said operating parameter does not reach a minimum set value.

6. The machine as claimed in claim 1, wherein said infusion chamber is controlled to reach a same closing position.

7. The machine as claimed in claim 1, wherein said control unit causes opening of the infusion chamber and unloading of the powder from said infusion chamber without giving rise to an infusion step, if at least one operation parameter of the electric actuator reaches or exceeds an alarm value before said infusion chamber has reached the closed position.

8. The machine as claimed in claim 1, wherein said infusion chamber comprises:
a plurality of closing positions.

9. The machine as claimed in claim 1, wherein said operating parameter of the electric actuator is determined based on a power absorbed by said electric actuator.

10. The machine as claimed in claim 1, wherein:
said operating parameter is determined as an average value of the current absorbed by the electric actuator in a time window during closing of the infusion chamber.

11. The machine as claimed in claim 10, wherein said operating parameter is defined by a maximum of said average value of the current absorbed by the electric actuator.

12. The machine as claimed in claim 1, wherein said known values are settable as a function of-qualitative properties of the coffee desired.

13. The machine as claimed in claim 1, wherein said doser comprises a grinding unit to grind the coffee beans and produce a coffee powder.

14. The machine as claimed in claim 13, wherein a sensor is associated with said grinding unit to determine a number of revolutions of the grinding unit said predetermined quantity of coffee powder being defined in terms of the number of revolutions of said grinding unit.

15. The machine as claimed in claim 1, wherein closing the infusion chamber takes place in variable positions as a function of said operating parameter, the closing movement and consequently compression of the coffee powder being interrupted when said operating parameter reaches a preset value.

16. The machine of claim 1, wherein the predetermined quantity of coffee power is defined in terms of number of revolutions of a grinding unit that grinds coffee beans to produce said coffee powder.

17. The machine of claim 1, wherein:
the operating parameter depends on a power absorbed by said electric actuator.

18. The machine of claim 1, wherein said operating parameter depends on a moving average value of the current absorbed by the electric actuator in a time window during closing of the infusion chamber.

19. The machine of claim 1, wherein the control unit further:
compares said parameter with an interval of known values settable as a function of the qualitative properties of the coffee desired.

20. The machine of claim 1, wherein the control unit closes the infusion chamber at variable positions as a function of said operating parameter, the closing movement and compression of the coffee powder being interrupted when said parameter reaches a present value.

* * * * *